United States Patent [19]

Stuck

[11] 4,176,589
[45] Dec. 4, 1979

[54] COOKING APPARATUS
[75] Inventor: Robert M. Stuck, Clover, S.C.
[73] Assignee: Marshall Air Systems, Inc., Charlotte, N.C.
[21] Appl. No.: 881,590
[22] Filed: Feb. 27, 1978
[51] Int. Cl.² ............................................. A47J 37/06
[52] U.S. Cl. ...................................... 99/386; 99/389; 99/443 C
[58] Field of Search ................. 99/386, 341, 349, 371, 99/417, 443 C, 447; 198/494, 497; 126/390

[56] References Cited
U.S. PATENT DOCUMENTS

| | | | |
|---|---|---|---|
| 2,312,339 | 3/1943 | Jones | 99/447 C X |
| 3,109,359 | 11/1963 | Falla | 99/417 X |
| 3,257,935 | 6/1966 | Temperato | 99/386 |
| 3,372,635 | 3/1968 | Meyer | 99/386 X |
| 3,456,578 | 7/1969 | Pinsly | 99/386 |
| 3,580,164 | 5/1971 | Baker | 99/443 C X |
| 3,611,913 | 10/1971 | McGinley | 99/386 X |
| 3,659,517 | 5/1972 | Holen | 99/443 C X |
| 3,695,170 | 10/1972 | Ehrenberg | 99/386 |
| 3,797,375 | 3/1974 | Cerola | 99/447 C X |
| 4,071,738 | 1/1978 | Jenn et al. | 99/447 C X |

Primary Examiner—Harvey C. Hornsby
Assistant Examiner—Arthur O. Henderson
Attorney, Agent, or Firm—Bell, Seltzer, Park & Gibson

[57] ABSTRACT

A cooking apparatus in which an endless conveyor moving through a heated cooking zone along a closed path of travel having upper and lower runs is cleaned by engagement with a guide which directs the lower run along a sinuous path. The cooking zone is enclosed by a housing having air flow passages which cooperate with a particular air flow circulating arrangement for cooling portions of the apparatus while minimizing loss of conditioned air from the building in which the apparatus is located. Provision is made for accommodating varying usage loads by selection of conveyor speed and heating levels.

13 Claims, 7 Drawing Figures

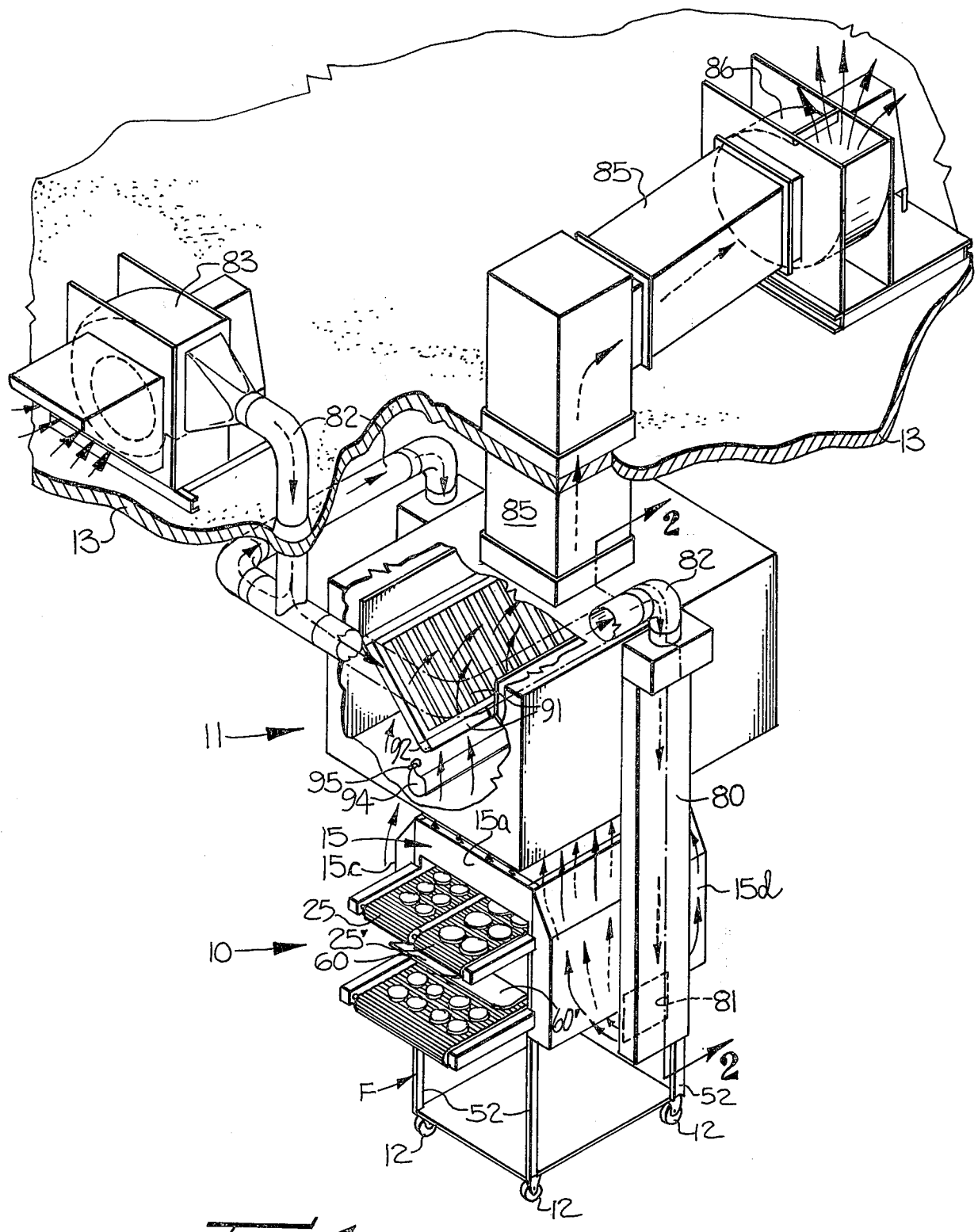

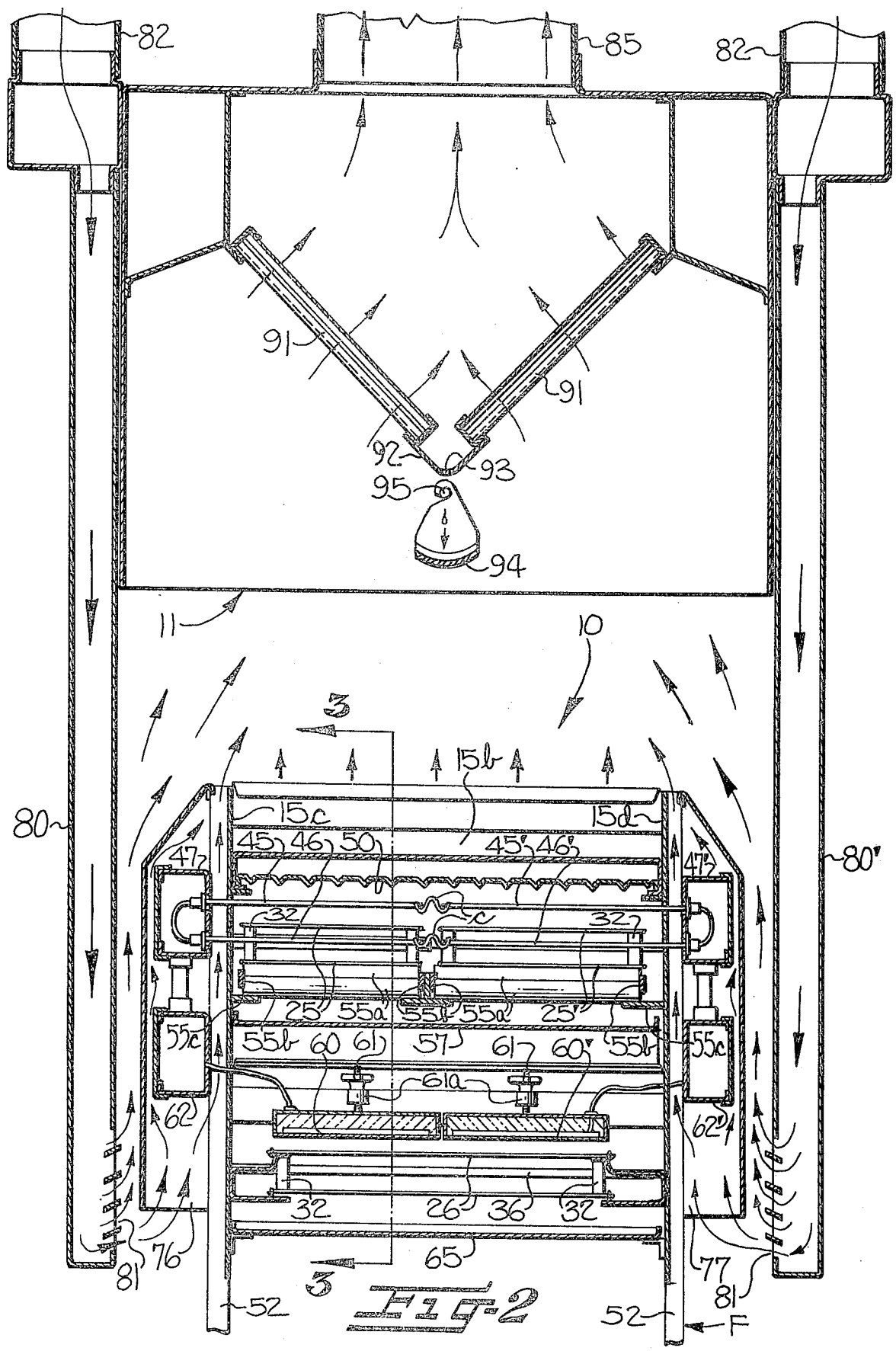

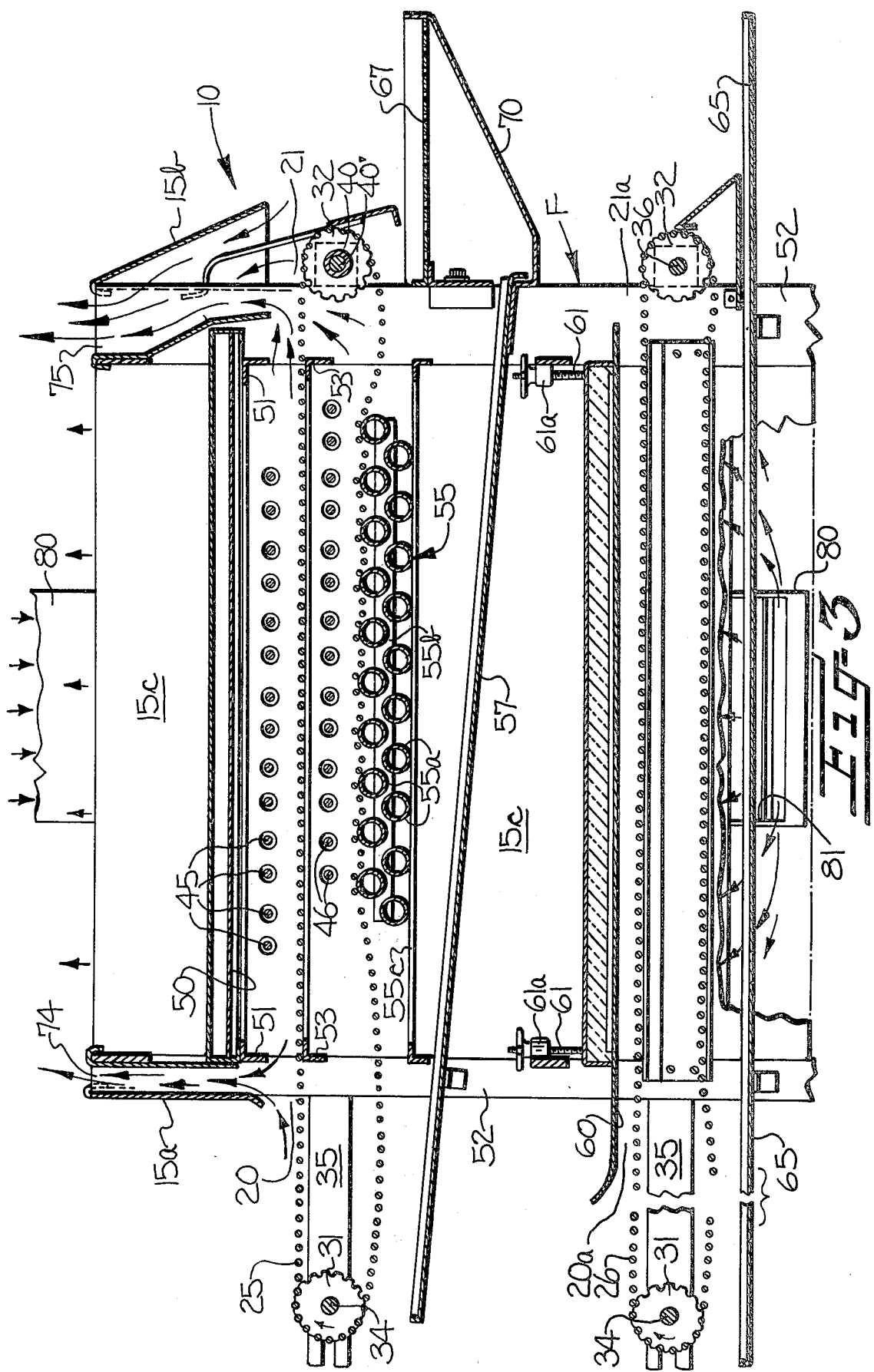

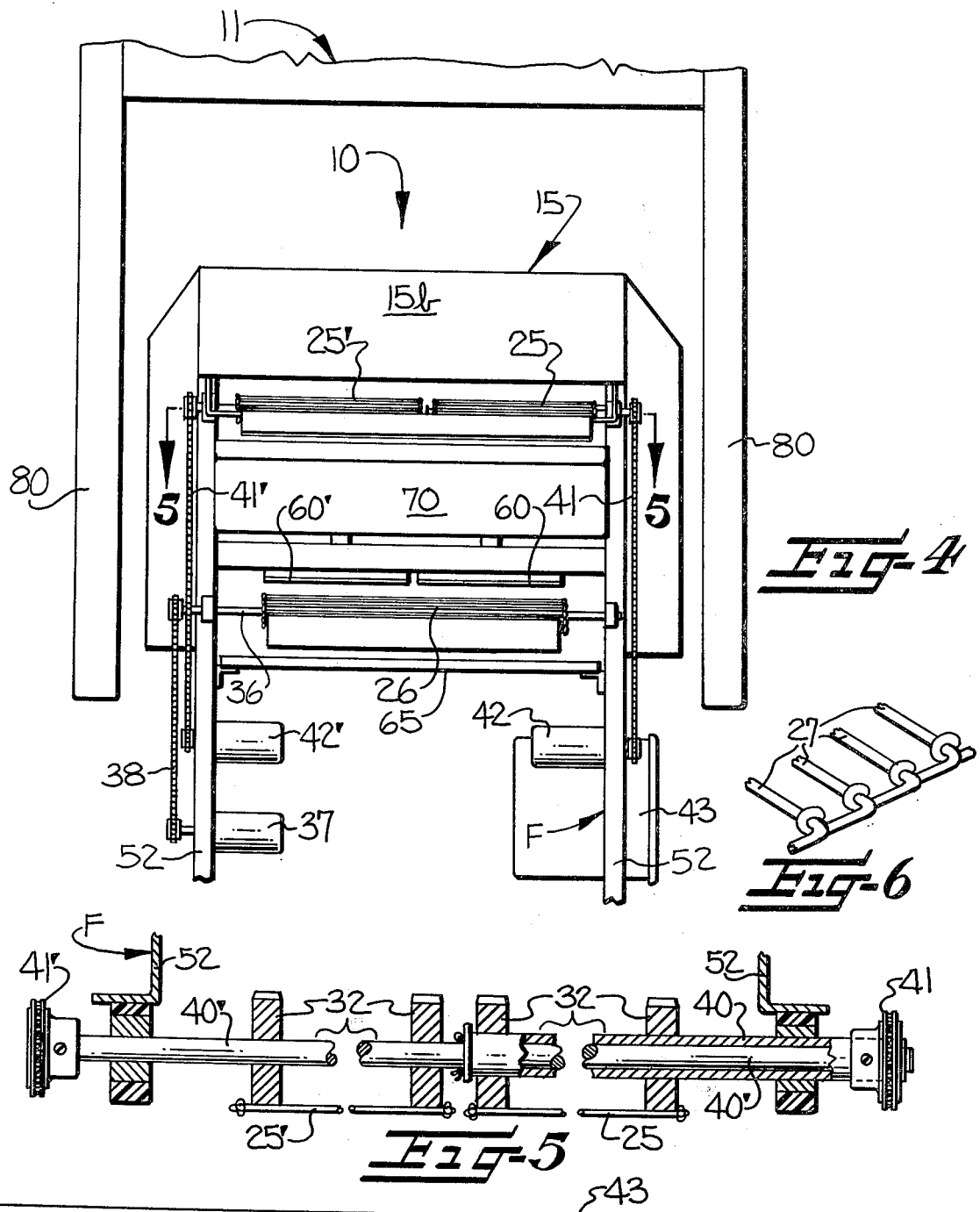

COOKING APPARATUS

Cooking of foodstuff such as meat patties or hamburgers by conveyor cooking apparatus has been known heretofore and such apparatus have achieved some commercial acceptance. As such apparatus have come into use, however, certain difficulties have been encountered and have posed problems for potential users, particularly in fast service restaurants or food stores.

Most successful fast service restaurant locations do a high volume of business, often concentrated into certain specific times of day. With such high volumes, it is important to an operator that cooking apparatus used be relatively clean and easily cleanable in order to facilitate maintenance of necessary sanitation standards with minimum down-time and operator effort. Ideally, cooking apparatus would be completely self-cleaning.

Another desirable characteristic for conveyor cooking apparatus used in fast service restaurants is adaptability to changing conditions of load. More particularly, concentration of high volumes of business into certain parts of a day leaves other parts of a day with substantially lower business volume. Desirably, cooking can be efficiently accomplished during both high and low volume time intervals.

Fast service restaurants doing high volumes of business typically are provided with air handling systems which provide for customer areas, heated air during colder seasons and cooled air during hotter seasons. Such conditioned air represents an energy consumption factor in the operation of such a restaurant, and efficient operation calls for minimizing loss of conditioned air. However, such minimization of air loss must be reconciled with the needs for cooling any cooking apparatus used and removing any cooking odors and/or effluent created.

With the above discussion in mind, it is an object of this invention to provide a cooking apparatus of the conveyor type capable of high productivity while maintaining sanitary conditions. In realizing this object of the present invention, a chain conveyor moved along a path of travel including an upper run along which foodstuff is conveyed for cooking and a lower, return run is engaged by a cleaning means which flexes the conveyor along a sinuous, undulating path to facilitate removal of any adhering foodstuff therefrom.

Yet a further object of this invention is the improvement of the energy efficiency of a conveyor cooking apparatus. In realizing this object of the present invention, provision is made for adapting the cooking apparatus to intervals of time in which high productivity is required and in which low productivity is acceptable by selectively switching off conveyors and associated heating elements. Adaptability to differing foodstuff, such as meat patties of differing sizes and cooking characteristics, is maintained by providing for variable speeds of conveying foodstuff through a cooking zone.

Another object of this invention is the improvement of the energy efficiency of a restaurant using a conveyor cooking apparatus. This object is realized by accomplishing the removal of cooking odors and/or airborne effluent and the cooling of the cooking apparatus with minimal disturbance of conditioned air flows within a restaurant building. Supply air for cooling and ventilation is delivered to the cooking apparatus where needed, and without passage through a furnace or air conditioner as would otherwise be necessary.

Some of the objects of the invention having been stated, other objects will appear as the description proceeds, when taken in connection with the accompanying drawings, in which

BRIEF DESCRIPTION OF THE DRAWINGS

FIG. 1 is a perspective view of the improved cooking apparatus of this invention with portions of a hood means thereof broken away;

FIG. 2 is an enlarged transverse vertical sectional view taken looking forwardly substantially along line 2—2 in FIG. 1;

FIG. 3 is a further enlarged, somewhat schematic, longitudinal vertical sectional view taken substantially along line 3—3 in FIG. 2;

FIG. 4 is an exit or front end elevational view looking generally at the right-hand side of FIG. 3, but being on a reduced scale;

FIG. 5 is an enlarged sectional plan view taken substantially along line 5—5 in FIG. 4, with portions broken away;

FIG. 6 is a fragmentary view of a preferred form of conveyor chain utilized in the apparatus; and FIG. 7 is an elevation of a suitable control panel for certain electrical components of the apparatus.

DETAILED DESCRIPTION

Referring more specifically to the drawings, with particular reference to FIGS. 1, 2 and 4, the improved cooking apparatus of this invention comprises a cooking unit 10 and a hood or air circulating unit 11 cooperatively arranged so that the air circulating unit 11 may circulate air past the cooking unit while the apparatus is in use and the units 10, 11 may be readily separated to position them remote from each other, if desired, during a general cleaning of the apparatus. To this end, the frame F of the cooking unit 10 may be mounted on suitable wheels 12, and the air circulating unit 11 may be stationarily supported, preferably by being suitably suspended from an adjacent ceiling or roof 13 of the room.

The cooking unit 10 comprises housing means 15 including rear and front, substantially vertically disposed, spaced apart end walls 15a, 15b and spaced left-hand and right-hand side walls 15c, 15d cooperating with the end walls 15a, 15b for enclosing a cooking zone. As best shown in FIG. 3, the rear and front end walls 15a, 15b define respective pairs of upper and lower exit and entrance openings 20, 20a and 21, 21a. The upper entrance and exit openings 20, 21 represent the rear and front ends of the broiler section or tunnel of the apparatus, and the lower entrance and exit openings 20a, 21a represent the rear and front ends of a toaster section or tunnel of the apparatus, such sections or tunnels together constituting the cooking zone enclosed by the housing means 15. The aforementioned broiler and toaster sections or tunnels are located one above the other and are provided with respective endless foodstuff conveyor means mounted to extend through the cooking zone and for movement along respective closed paths of travel and having upper and lower runs.

Such conveyor means is embodied herein in the form of first and second endless broiler conveyor chains or chain members 25, 25' arranged in side by side or coaxial relationship and extending entirely through and outwardly of the entrance and exit openings 20, 21 of the upper or broiler section of the apparatus. The conveyor means is further embodied herein in the form of a single endless toaster conveyor chain or chain member 26 which is spaced below the endless broiler conveyor chains 25, 25' and extends throughout the length of and outwardly of the entrance and exit openings 20a, 21a of the lower or toaster section of the apparatus. Each endless conveyor chain 25, 25', 26 is of a type known as an open-work conveyor and is formed of a series of interconnected widthwise bar links such as are indicated at 27 in FIG. 6.

The conveyor chains 25, 25', 26 are each entrained about pairs of rear and front sprocket wheels 31, 32, respectively. The upper and lower rear sprocket wheels 31 for the corresponding conveyor chains 25, 25' and 26 are rotatably mounted on respective upper and lower shafts 34 suitably adjustable forwardly and rearwardly in cantilever arms 35 carried by the frame F of the cooking unit 10. The front sprocket wheels 32 for the lower conveyor 26 are fixedly mounted on a shaft 36 journaled on the frame F and being driven by a suitable variable speed motive means, preferably an electric motor 37, through intervening drive connections 38 (FIG. 4).

As shown in FIGS. 2 and 3, the broiler conveyor chains 25, 25' have substantially common turning locations and substantially horizontally aligned upper runs. Also, it is preferred that one of the upper or broiler conveyor chains 25, 25' is narrower than the other upper conveyor chain, particularly for facilitating cooking relatively small and relatively large meat patties at the same time on the two respective broiler conveyor chains 25, 25' during periods of high demand. Accordingly, in this instance, the first conveyor chain 25 is shown in FIGS. 1, 2, 4 and 5 as being somewhat narrower than the second conveyor chain 25', and for purposes of description only, these two conveyor chains 25, 25' may be considered to be twelve inches and fifteen inches wide, respectively. Further, since it is desirable to cook the relatively smaller and thinner meat patties on the first conveyor chain 25 while the relatively larger and thicker meat patties are being cooked on the second conveyor chain 25' during the aforementioned periods of demand, it is desirable that the two broiler conveyor chains 25, 25' not only be arranged so that their speeds may be varied independently of each other, but it is also desirable that one of the broiler conveyor chains; i.e., the narrower conveyor chain 25 in this instance, be arranged so as to be moved at a relatively faster speed than the other broiler conveyor chain 25'. Accordingly, as shown in FIG. 5, the two front sprocket wheels 32 for the first endless conveyor chain 25 are mounted on a different shaft from that on which the two front sprocket wheels 32 for the second endless conveyor chain 25' are mounted. More particularly, as shown in FIG. 5, the two front sprocket wheels 32 for the first endless conveyor chain 25 are fixedly mounted on a tubular shaft 40 coaxially of and positioned on an elongate shaft 40' on which the two front sprocket wheels 32 of the second endless conveyor chain 25' are fixedly mounted. The shafts 40, 40' are thus rotatable relative to each other. These shafts 40, 40' are mounted in suitable bearings carried by the frame F of the cooking unit 10.

The shafts 40, 40' project outwardly away from the distal sides of the endless conveyor chains 25, 25' and have respective drive connections 41, 41', such as sprocket wheels and chains, connecting the same to respective variable speed motive means or electric motors 42, 42' (FIG. 4). The electric motors 37, 42, 42' for the respective conveyor chains 26, 25, 25' are controlled by respective switches 26a, 25a, 25a' and rheostats 26b, 25b, 25b' (FIG. 7) mounted on a control panel 43 and being suitably electrically connected to the respective electric motors 37, 42, 42'. Since such electrical connections and any related controls may be readily effected by a skilled electrician, an illustration and a description of such electrical controls and connections is deemed unnecessary. It is apparent, however, that the effective speed of each endless conveyor chain 25, 25', 26 may be selectably varied and may also be readily adjusted relative to the other endless conveyor chains by simply manually adjusting respective rheostats 25b, 25b', 26b.

With a view to saving electrical energy at times of relatively low demand for the relatively small and relatively large meat patties, it is to be noted, for example, that the first broiler conveyor chain 25, and corresponding heating means to be later described, may be completely shut off, and by manually adjusting the rheostat 25b', the speed of the fifteen-inch endless conveyor chain 25' may be relatively increased at such times that relatively small, thin meat patties are being carried thereby through the cooking zone, as compared to the speed at which the fifteen-inch conveyor chain 25' is operated when carrying relatively larger meat patties through the cooking zone.

In this regard, it is contemplated that the control panel 43 of FIG. 7 may be suitably marked adjacent the rheostat 25b' so that it may be quickly moved to either of two thusly indicated positions during the passage of the respective relatively small and relatively large meat patties on the fifteen-inch conveyor chain 25' through the cooking zone. Alternatively, it is comtemplated that an additional switch and an additional rheostat, similar to the respective switch 25a' and rheostat 25b', may be provided in the electrical circuit to the electric motor 42' which controls the rate of speed of the fifteen-inch conveyor chain 25', and the two switches then may be manually used alternatively for starting and stopping the corresponding endless conveyor chain 25', with the respective rheostats, including rheostat 25b', being preset or pre-adjusted for operating the conveyor chain 25' at two different predetermined speeds simply by selectively operating the corresponding switch 25a' or the alternative switch thereto, as the case may be.

The means for heating the cooking zone in the tunnel through which the upper or broiler conveyor chains 25, 25' extend comprises side-by-side sets of upper and lower, substantially horizontal rows of electrical resistance heating elements 45, 46 and 45', 46' (FIGS. 2 and 3) positioned above and beneath the substantially straight upper runs of the corresponding endless conveyor chains 25, 25'. Stated otherwise, the rows of heating elements 45, 46 constitute a first set and are respectively positioned over and beneath the upper run of the first broiler conveyor chain 25, and the rows of heating elements 45', 46' constitute a second set and are respectively positioned over and beneath the upper run of the second broiler conveyor 25'. Each adjacent pair of heating elements in each upper and lower row may be substantially U-shaped in plan, with the proximal portions of the heating elements in adjacent horizontally opposed rows being supported in suitable cradles c suitably supported between the proximal sides of the first and second broiler conveyor chains 25, 25'.

The major or heating portions of the heating elements 45, 45', 46, 46' are positioned within the cooking zone, but terminal portions of the heating elements extend through the adjacent portions of the opposite side walls 15c, 15d of the housing means 15 and are, therefore, positioned outside the cooking zone. The distal terminal portions of the resistance heating elements 45, 46 and 45', 46' extend into suitable junction boxes 47, 47' containing suitable electrical conductors or wiring for interconnecting corresponding terminal portions of the heating elements and also having suitable conductor means extending therefrom, not shown, for connecting the heating elements 45, 46 to a suitable "On-Off" switch 45a, and for connecting the heating elements 45', 46' to a suitable "On-Off" switch 45a' on the control panel 43 of FIG. 7. It is thus apparent that the sets of heating elements 45, 46 and 45', 46', for cooking foodstuff on the respective broiler conveyors 25, 25', may be energized and deenergized selectively and independently of each other by manual operation of the switches 45a, 45a'.

A suitable heat reflecting member or plate 50 (FIGS. 2 and 3) is shown positioned over and in closely spaced relation above the upper rows of electrical resistance heating elements 45, 45' to aid in heating the ambient air for cooking the meat patties being advanced on the upper runs of the respective conveyor chains 25, 25'. The reflecting member 50 may rest upon suitable transverse frame members 51 (FIG. 3) suitably secured to and extending between upright corner posts 52 of the frame F of the cooking unit 10. In this regard, it will be observed in FIG. 1 that the wheels of the frame F are connected to the lower ends of the corner posts 52. Frame members 53, similar to the frame members 51 last described, may be provided for supporting the upper reaches of the broiler conveyor chains 25, 25'.

According to the invention, an improved conveyor cleaning means, broadly designated at 55 in FIG. 3, is mounted in the housing means 15 for engaging the conveyor means embodied in each of the broiler endless conveyor chains 25, 25', along the lower runs thereof, and for guiding the engaged lower runs in a sinuous or undulating path to facilitate dislodging therefrom any adhering foodstuff. As shown in FIG. 2, the cleaning means 55 comprises two side-by-side sets of a plurality of generally cylindrical members 55a (FIG. 3), which may be in the form of tubular members, bars or rods, and which are mounted in the housing so as to extend generally parallel to one another in a generally horizontal array underlying the lower run of each of the two side-by-side conveyor chains 25, 25' (see FIG. 2).

Conveniently, each set of the generally cylindrical members 55a may be arranged in alternately spaced relation in the form of two superposed rows of such elements arranged in spaced relation as shown in FIG. 3, with each of the opposite ends of the cylindrical members 55a in such two rows being secured to a common bar or frame member 55b. In this way, the bottommost of the two rows of cylindrical members 55a may rest upon a suitable support frame means 55c carried by the frame F of the cooking unit 10 and, when desired, each entire set of the cylindrical members 55a may be inverted to perform its intended function when again positioned on the supporting frame means 55c.

It should be noted that the cleaning means 55 is positioned beneath the lower rows of heating elements 46, 46' (FIGS. 2 and 3) for the respective first and second broiler conveyor chains 25, 25' so that the lower runs of such chains are undulated and rub against the corresponding generally cylindrical members 55a while passing beneath the heating elements 46, 46' and so that foodstuff adhering thereto may be charred and easily fragmented as the corresponding lower runs of the endless conveyor chains 25, 25' are sliding against and being moved in an undulating path by the corresponding generally cylindrical members 55a of the cleaning means 55. Thus, the charred foodstuff is more readily dislodged from the link bars of the conveyor chains 25, 25' and will fall between the cylindrical members 55a to be collected upon a suitable forwardly and downwardly inclined collecting tray 57.

As is well known, in the preparation of hamburgers and the like, the buns for the hamburgers are toasted and they are usually cut in half before being toasted, with one-half of each bun usually being thicker than the other half of the corresponding bun. Therefore, it will be observed in FIGS. 2 and 3 that two side-by-side forwardly and rearwardly extending heated toaster platens 60, 60' are provided which are mounted for individual vertical or up-and-down adjustment above the toaster conveyor chain 26 by means of threaded rods 61 thereon which extend upwardly and threadedly penetrate nuts 61a carried by the frame F of the cooking unit 10. The electrically heated platens 60, 60' are electrically connected, through junction boxes 62, 62' (FIG. 2), to respective "On-Off" switches 60a, 60a' mounted on the control panel 43 of FIG. 7. Further, the electrically heated toaster platens 60, 60' are electrically connected to a suitable rheostat 64 carried by the control panel 43 of FIG. 7 and which may be suitably manually adjusted for selectively establishing the temperature of the lower surfaces of the toaster platens 60, 60'. The junction boxes 62, 62' may be suitably secured to the frame F and are shown positioned beneath the junction boxes 47, 47', respectively, in FIG. 2. A suitable catch tray 65 (FIGS. 2, 3 and 4) for bread crumbs and the like is suitably supported beneath the endless toaster conveyor chain 26 by the frame F of the cooking unit 10.

It is to be noted that the tray 65 extends forwardly a sufficient distance beyond the front portion of the toaster endless conveyor chain 26 so that successive toasted buns are discharged from the forward portion of the toaster conveyor chain 26 onto the tray 65. The front corner posts 52 of the frame F of the cooking unit 10 also support a suitable holding tray 67 which extends beneath and forwardly beyond the front portions of the endless broiler conveyor chains 25, 25a for receiving the successive cooked meat patties or other foodstuff discharged off the front end portions of the latter conveyor chains. It is preferred that the bottom of the holding tray 67 is perforated and suitably removably supported upon a suitable reservoir 70 for catching any grease or foodstuff which may be dislodged from or drip from the cooked meat patties.

It is desirable to not only direct unwanted heated ambient air away from the entrance and exit openings 20, 21 of the housing means 15 of the cooking unit 10, but it is also desirable to dissipate excessive heat away from the walls of the housing means, and it is particularly desirable to direct heated air away from the terminal portions of the electrical resistance heating elements 45, 46, 45', 46' to aid in preventing charring of the electrical conductors in the vicinity of the terminal portions of the electrical resistance heating elements to thereby prolong the useful life of such electrical conductors. Therefore, the upper portions of the front and rear walls 15a, 15b, as well as at least the major portions of the opposing side walls 15d, 15c, of the housing means 15 are of built-up construction to define respective generally vertically extending air flow passages 74, 75, 76, 77 therein which are open at their bottom and top portions for the flow of air upwardly therethrough. It will be observed in FIG. 3 that the open bottoms of the passages 74, 75 in the front and rear walls 15a, 15b are located closely above the broiler conveyor chains 25, 25' adjacent the rear and front ends of the cooking zone. Further, it will be observed in FIG. 2 that the passages 76, 77 serve as enclosures within which are positioned the respective junction boxes 47, 47' for the terminal ends of the electrical resistance heating elements 45, 46, 45', 46' as well as the junction boxes 62, 62'.

The hood means 11 is provided for delivering closely adjacent the housing means 15 and for exhausting from above the housing means substantially equal volumes of supply and exhaust air. More particularly it will be observed in FIG. 2 that the hood means 11 is in the form of a canopy of generally rectangular configuration and has an open bottom with a pair of laterally opposed depending supply ducts 80, 80' thereon, constituting supply duct means, and being positioned so that they straddle medial portions of the housing means 15 in relatively close proximity thereto when the cooking unit 10 occupies an operative position relative to the hood means 11 as shown in FIGS. 1, 2 and 4.

As preferred, and as is shown in FIG. 2, the lower ends of the depending ducts 80 are closed, and the proximal walls of the lower portions thereof are provided with respective louvered openings 81 so positioned as to exhaust so-called make-up air into the open lower ends or bottoms of the passages 76, 77 in the opposite side walls 15c, 15d of the housing means 15. Such make-up air is relatively cool as it is exhausted from the louvered openings 81 and thus the junction boxes 47, 47', 62, 62' are subjected to relatively cool air flowing thereby as it flows upwardly and outwardly through the rather relatively restricted upper ends of the passages 76, 77.

The upper ends of the depending ducts 80 are communicatively connected, via a piping system 82 (FIG. 1), to a suitable blower or fan means 83 which may be above the ceiling 13 or on the roof of the room and which receives outside atmospheric air and blows the same into and through the ducts 80 to be exhausted adjacent the lower portions of the housing means 15 in the manner heretofore described. The upper portion of the hood means 11 is communicatively connected, via a duct system 85, to the suction side of an exhaust fan or blower 86 (FIG. 1) which also may be positioned above the ceiling 13 for exhausting the air drawn into the hood means or canopy 11 outside the building. Thus it can be seen that, since the hood means 11 overlies the cooking unit 10 in operative position, the air exhausted from the ducts 80 and the ambient air heated by the cooking unit 10 when in operation is drawn upwardly, as represented by the air flow arrows in FIG. 2, and exhausted by the suction fan 86.

Since the air being drawn upwardly from the cooking unit 10 may have substantial amounts of grease suspended therein, in its course through the hood means 11 the air flows through a pair of filters 91 which are inclined downwardly and inwardly toward each other in FIG. 2 so that any grease which condenses and collects thereon will flow into a trough 92 extending between opposite side walls of the hood means 11 and having an opening or openings 93 along its lowermost portion for emptying into a suitable catch tray 94 removably suspended, as at 95, within the hood means 11. The filters 91 may be of a well-known type formed of overlapping channel-shaped members with the flanges of alternate such members facing toward the flanges of the intervening of such members. Accordingly, a more detailed description of the filters 91 is deemed unnecessary.

From the foregoing description it can be seen that there is provided a cooking unit 10 and a hood means 11 cooperating therewith for delivering supply air closely adjacent the housing means 15 of the cooking unit and for exhausting a substantially equal volume of air from above the housing means. It can be seen further that the housing means 15 encloses a cooking zone through which endless foodstuff conveyor means is mounted to extend for movement along a closed path of travel and wherein the conveyor chains 25, 25', constituting the preferred embodiment of such conveyor means, have upper and lower runs, and heating means 45, 46, 45', 46' are mounted in the housing means 15 for heating the cooking zone and cooking foodstuff being conveyed therethrough along the upper run or upper runs of the conveyor means. It can be seen that the invention also provides conveyor cleaning means 55 mounted in the housing means for engaging the conveyor means along the lower run or lower runs thereof and for guiding the engaged conveyor means in a sinuous or undulating path (FIG. 3) for facilitating dislodging therefrom any adhering foodstuff.

In the drawings and specification there has been set forth a preferred embodiment of the invention, and although specific terms have been employed, they are used in a generic and descriptive sense only and not for purposes of limitation.

That which is claimed is:

1. A cooking apparatus comprising:
 housing means for enclosing a cooking zone,
 endless foodstuff chain conveyor means mounted to extend through said cooking zone and for movement along a closed path of travel having upper and lower runs,
 heating means mounted in said housing means for heating said cooking zone and for cooking foodstuff conveyed therethrough along said upper run of said conveyor means, and
 conveyor cleaning means comprising a plurality of generally cylinderical members stationarily fixed in said housing means to extend generally parallel one to another in a generally horizontal array underlying said lower run for engaging said conveyor means along said lower run and for guiding said engaged conveyor means in a sinuous path for facilitating dislodging therefrom any adhering foodstuff.

2. Apparatus according to claim 1 wherein said housing means comprises spaced end walls defining entrance and exit openings for conveyed foodstuff and spaced side walls cooperating with said end walls for enclosing said cooking zone, at least certain of said walls defining generally vertically extending air flow passages for cooling and ventilation of said apparatus.

3. Apparatus according to claim 1 wherein said conveyor means comprises first and second endless chain members each having widthwise extending bar links for supporting foodstuff, and means mounting said first and second members side-by-side and for driving said first and second members independently one from the other along respective closed paths of travel having common turning locations and substantially horizontally aligned upper runs.

4. Apparatus according to claim 3 wherein said means for driving said first and second members comprises first and second variable speed means for driving respective one of said members at selectably varied speeds along said closed paths of travel.

5. Apparatus according to claim 4 wherein at least one of said variable speed means comprises range selection means for selecting one of a high speed and a low speed for the respective one of said members whereby cooking of foodstuff of two predetermined cooking characteristics is facilitated.

6. Apparatus according to claim 3 wherein said heating means comprises a plurality of electrical heating elements arranged in first and second sets respectively extending adjacent said first and second members, and switch means electrically connected to said elements for selectively energizing said first and second sets of elements whereby cooking of foodstuff on only one of said members is facilitated.

7. Apparatus according to claim 1 wherein said conveyor means comprises first and second endless chain members each having widthwise extending bar links for supporting foodstuff, and means mounting said first and second members in generally superposed array and for driving said first and second members independently one from the other along respective closed paths of travel having generally superposed, vertically spaced apart, upper runs.

8. Apparatus according to claim 1 wherein said conveyor means comprises at least one endless chain member having widthwise extending bar links for supporting foodstuff, and means for driving said chain member at selectably varied speeds along said closed path of travel.

9. Apparatus according to claim 1 wherein said heating means comprises a plurality of electrical resistance heating elements having terminal portions extending outside said cooking zone and heating portions extending into said cooking zone, and further comprising means for circulating cooling air across said terminal portions.

10. A cooking apparatus comprising:
    housing means for enclosing a cooking zone,
    endless foodstuff chain conveyor means mounted to extend through said cooking zone and for movement along a closed path of travel having upper and lower runs,
    heating means mounted in said housing means for heating said cooking zone and for cooking foodstuff conveyed therethrough along said upper run of said conveyor means,
    conveyor cleaning means comprising a plurality of generally cylindrical members stationarily fixed in said housing means to extend generally parallel one to another in a generally horizontal array underlying said lower run for engaging said conveyor means along said lower run and for guiding said engaged conveyor means in a sinuous path for facilitating dislodging therefrom any adhering foodstuff, and
    hood means separate from and straddling and overlying said housing means for delivering closely adjacent said housing means a volume of supply air and for exhausting from above said housing means a volume of exhaust air substantially equal to the volume of supply air.

11. Apparatus according to claim 10 wherein said hood means comprises supply duct means depending adjacent said housing means for delivering supply air below and ambient to said cooking zone and canopy means overlying said housing means for drawing air ambient to said cooking zone upwardly.

12. Apparatus according to claim 10 wherein said housing means comprises spaced end walls defining entrance and exit openings for conveyed foodstuff and spaced side walls cooperating with said end walls for enclosing said cooking zone, at least certain of said walls defining generally vertically extending air flow passages for cooling and ventilation of said apparatus by said supply air.

13. Apparatus according to claim 12 wherein said heating means comprises a plurality of electrical resistance heating elements having heating portions extending into said cooking zone and terminal portions extending outside said cooking zone into said air flow passages for circulation of cooling supply air across said terminal portions.

* * * * *